Patented Nov. 13, 1951

2,574,649

UNITED STATES PATENT OFFICE 2,574,649

ALKYL ETHER OF CHLOROFLUORO-HEPTENE

Earl T. McBee and William S. Barnhart, West Lafayette, Ind., assignors to the United States of America as represented by the United States Atomic Energy Commission No Drawing. Application September 10, 1945, Serial No. 615,498

6 Claims. (Cl. 260—614)

This invention relates to new organic ethers and their manufacture.

The invention has for an object the preparation of novel halogenated alkyl ethers containing high proportions of fluorine.

The novel ethers of the invention are ethers of halogenated heptenes containing at least eight fluorine atoms in the heptene radical. They are prepared by reacting a metal alcoholate with a highly fluorinated product of halogenated heptane.

In the manufacture of highly fluorinated derivatives of heptane, normal heptane is chlorinated by means of elemental chlorine in the presence of light to a chlorine content corresponding to the approximate average molecular formula $C_7H_4Cl_{12}$. This product is considered to comprise mainly position isomers of normal dodecachloroheptane. The dodecachloroheptane is fluorinated by treatment with hydrogen fluoride in the presence of a salt of pentavalent antimony or by a combination of this treatment and a subsequent treatment with antimony pentafluoride.

The organic product of the fluorination treatment comprises unsaturated halogenated derivatives of heptene in which 9 or 10 of the chlorine atoms have been replaced by fluorine atoms. The unsaturated halogen derivatives of heptene containing 9 and 10 fluorine atoms and 2 and 3 residual chlorine atoms in the molecule are liquids boiling between 115° C. and 140° C. and are capable of reaction with metallic alcoholates, such as sodium methylate and sodium ethylate, to form mono-alkyl and di-alkyl ethers of the halogenated derivatives. The unsaturated halogenated fraction distilling between 115° C. and 120° C. contains two residual chlorine atoms in the molecule and has a halogen content corresponding to the molecular formula $C_7H_2Cl_2F_{10}$. The unsaturated fraction distilling at about 138° C. contains three residual chlorine atoms in the molecule and has a halogen content corresponding to the molecular formula $C_7H_2Cl_3F_9$.

The alkoxy derivatives of these products may be obtained by reaction with alkali-metal alcoholates at ordinary or elevated temperatures in liquid phase. In the case of the halogenated compound containing only 2 chlorine atoms, one of the chlorine atoms is replaced by the alkoxy group to form a compound of the molecular formula $C_7H_2ClF_{10}X$, wherein X represents an alkoxy radical. In the case of the compound containing 3 chlorine atoms, one of the fluorine atoms as well as one of the chlorine atoms is replaced by an alkoxy group to form a compound of the molecular formula $C_7H_2Cl_2F_8X_2$, wherein X represents an alkoxy radical.

The following examples further illustrate the invention.

EXAMPLE 1

*Monochloro-decafluoro-methoxy-heptane*

A halogenated derivative of heptane (prepared by (1) passing gaseous chlorine into illuminated liquid normal heptane at a temperature maintained between 85° C. and 90° C. for twenty hours to provide a chlorine content of approximately 82½% by weight chlorine, (2) mixing the product with approximately one-half its weight of antimony pentachloride and passing hydrogen fluoride through the mixture maintained at a temperature of 110° C. for about six hours to provide an organic product containing about 27% fluorine and 52% chlorine, and (3) heating the resulting organic product with approximately one and one-half times its weight of antimony pentafluoride at a temperature of 150° C. for 8 hours to provide a product containing about 60% fluorine and 15% chlorine) was fractionally distilled to provide a refined product distilling between 115° C. and 120° C. This product had a composition corresponding approximately to the general formula $C_7H_2Cl_2F_{10}$ and comprised a crude mixture of this compound with more highly fluorinated material and highly fluorinated compounds possessing higher and lower degrees of saturation. (The same product can be obtained by more vigorous treatment in step (2), omitting the step (3) treatment.)

One hundred grams of a sodium methylate solution, containing 20 grams of anhydrous sodium hydroxide and 80 grams of methanol, was added dropwise to a flask containing 175 grams of the distillate while the temperature of its contents was maintained below 20° C. by an ice bath. After the sodium methylate had been added, the mixture was stirred for 30 minutes at room temperature, then heated to 35° C. and stirred for an additional thirty minutes. The product was washed with water, dried by "Drierite" and fractionally distilled. Thirty-three percent by volume distilled between 150° and 152° C. This distillate was found to contain 11.8% chlorine and 55.6% fluorine by weight. Its molecular weight was 346 as determined by the Victor Meyer method. The refractive index of the product was measured at 20° C. using a Mazda type incandescent filament lamp light source and was found to be 1.3565. The anaylsis and molecular weight of the product correspond to the molecular formula $C_7H_2ClF_{10}OCH_3$.

EXAMPLE 2

*Monochloro-decafluoro-ethoxy-heptene*

One hundred seventy-five grams of a distillate fraction distilling at 115–120° C., obtained as described in Example 1 and having the constitution $C_7H_2Cl_2F_{10}$, was placed in a half-liter 3-neck flask fitted with a dropping funnel, a stirrer, and a reflux condenser. The flask was immersed in an ice bath and 20 grams of anhydrous sodium hydroxide dissolved in 100 grams of ethanol was added dropwise from the dropping funnel while the temperature of the contents of the flask was maintained below 150° C. When all of the reagents had been added, the flask contents were stirred for 30 minutes at room temperature, then heated to 45° C. and stirred for an additional thirty minutes at this temperature. The product was washed with water, dried by "Drierite," and distilled in a still provided with a rectifying column. Approximately 50% of the distilland distilled at 160–161° C. This fraction was analyzed and was found to contain 11.4% chlorine and 53.5% fluorine. Its molecular weight, as determined by depression of the freezing point of benzene, was 365. Its refractive index, determined as in Example 1, was 1.3586. The analysis and molecular weight determinations indicate that this product has the constitution $C_7H_2ClF_{10}OC_2H_5$.

EXAMPLE 3

*Dichloro-octafluoro-dimethoxy-heptene*

Three hundred grams of a $C_7H_2Cl_3F_9$ product distilling at 138–139° C., and obtained by fluorination of chlorinated heptane in the general manner described in Example 1, steps (1) and (2), was placed in a flask equipped as described in Example 2, and 108 grams of sodium methylate, prepared by dissolving 45 grams of metallic sodium in 350 milliliters of methanol was added slowly while keeping the temperature of the flask below 30° C. After all of the sodium methylate had been added the mixture was stirred for several hours at room temperature. The product was washed with water, dried by "Drierite," and distilled in a still equipped with a rectifying column. From the distillate a fraction amounting to 5% of the distilland was obtained at a vapor temperature of 179° to 181° C. This fraction was found to contain 19.4% chlorine and 41.8% fluorine and to have a molecular weight of 360, corresponding to the molecular formula $C_7H_2Cl_2F_8(OCH_3)_2$. Its refractive index was 1.389.

The novel ethers of the present invention are useful as solvents and intermediates.

It will be understood that we intend to include variations and modifications of the invention and that the preceding examples are illustrations only and in no wise to be construed as limitations upon the invention, the scope of which is defined in the appended claims, wherein

We claim:

1. As a new compound, an alkyl ether of a chlorofluoroheptene containing at least 8 fluorine atoms in the heptene radical.

2. As a new compound, an alkyl ether of a chlorofluoroheptene containing at least one chlorine atom and at least 8 fluorine atoms in the heptene radical.

3. As new compounds, the chlorofluoroethers of the general formula $C_7H_2ClF_{10}X$, wherein X represents an alkoxy radical.

4. As a new compound, the chlorofluoroheptene methyl ether $C_7H_2ClF_{10}OCH_3$, having a boiling point of about 150° C. and a refractive index of about 1.36.

5. As a new compound, the chlorofluoroheptene ethyl ether $C_7H_2ClF_{10}OC_2H_5$, having a boiling point of about 160° C. and a refractive index of about 1.36.

6. As a new compound, the chlorofluoroheptene dimethyl ether $C_7H_2Cl_2F_8(OCH_3)_2$, having a boiling point of about 180° C. and a refractive index of about 1.39.

EARL T. McBEE.
WILLIAM S. BARNHART.

REFERENCES CITED

The following references are of record in the file of this patent:

UNITED STATES PATENTS

| Number | Name | Date |
|---|---|---|
| 2,336,921 | Benning | Dec. 14, 1943 |

FOREIGN PATENTS

| Number | Country | Date |
|---|---|---|
| 523,449 | Great Britain | July 15, 1940 |

OTHER REFERENCES

Swartz: "Centralblatt" 1899, II, page 281.
Swartz: "Centralblatt" 1901, II, page 804.
Swartz: "Centralblatt" 1903, I, page 13.
Swartz: "Centralblatt" 1911, II, page 848.
McBee et al.: "Industrial and Engineering Chemistry," American Chemical Society, Easton, Pa., March 1947, vol. 39, pages 412–15 (Abstract of a Doctoral Thesis by Bolt, performed at Purdue University, 1944).